(12) United States Patent
Benmouyal et al.

(10) Patent No.: US 6,757,146 B2
(45) Date of Patent: Jun. 29, 2004

(54) INSTANTANEOUS OVERCURRENT ELEMENT FOR HEAVILY SATURATED CURRENT IN A POWER SYSTEM

(75) Inventors: Gabriel Benmouyal, Boucherville (CA); Stanley E. Zocholl, Holland, PA (US); Armando Guzman-Casillas, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 10/160,428

(22) Filed: May 31, 2002

(65) Prior Publication Data

US 2003/0223171 A1 Dec. 4, 2003

(51) Int. Cl.[7] ................................................ H02H 3/00
(52) U.S. Cl. ........................................ 361/93.6; 361/87
(58) Field of Search ............................. 361/65, 76–80, 361/84, 87, 92, 93.1, 93.2, 93.6; 324/207.2, 207.15, 522, 620; 702/104, 116; 700/292–294

(56) References Cited

U.S. PATENT DOCUMENTS

| | | | | |
|---|---|---|---|---|
| 3,657,605 A | * | 4/1972 | Hill ............................. | 361/95 |
| 3,846,675 A | * | 11/1974 | Shimp ......................... | 361/95 |
| 4,903,163 A | * | 2/1990 | Atwater et al. ............. | 361/113 |
| 5,237,511 A | * | 8/1993 | Caird et al. .................. | 702/58 |
| 6,160,697 A | * | 12/2000 | Edel ............................ | 361/143 |
| 6,356,421 B1 | * | 3/2002 | Guzman-Casillas et al. .. | 361/36 |

* cited by examiner

*Primary Examiner*—Ronald W. Leja
(74) *Attorney, Agent, or Firm*—Cook, Alex, McFarron, Manzo, Cummings & Mehler

(57) ABSTRACT

The instantaneous overcurrent element, used in a microprocessor-based protective relay for a power system, includes a finite impulse response filter which generally is a cosine filter and is responsive to the current waveform from the current transformer for fault determination unless the distortion in the current reaches a preselected threshold, at which point a peak detector circuit is used to provide the current magnitude values for fault determination.

7 Claims, 3 Drawing Sheets

US 6,757,146 B2

INSTANTANEOUS OVERCURRENT ELEMENT FOR HEAVILY SATURATED CURRENT IN A POWER SYSTEM

TECHNICAL FIELD

This invention relates generally to instantaneous overcurrent elements used in microprocessor-based protective relays for power systems and more specifically concerns such an overcurrent element which provides accurate current magnitude information under normal operating conditions and when the current waveform from the current transformer is heavily saturated.

BACKGROUND OF THE INVENTION

Instantaneous overcurrent elements are commonly used in protective relays for power systems. The instantaneous current magnitude is compared against a threshold value for fault determination on the preselected line. Overcurrent elements which are implemented in digital form in microprocessor-based protective relays typically use a pair of orthogonal finite impulse filters to properly compute the complex number which represents the magnitude of the fundamental component phasor of the line current. Fourier filters and cosine filters are commonly used examples of such filters. Using such a filter to obtain magnitude values, the fundamental phasor I of a time varying current waveform i(t), with period T, is sampled at a rate of N samples per cycle in accordance with the following formula:

$$I = \frac{2}{N}\sum_{n=0}^{N-1} i(n)e^{j(2\pi n/N)}$$

The magnitude of the current waveform is then obtained by taking the absolute value of the fundamental phasor. The most typical values of N are 8, 12, 16 or 24 samples-per-cycle.

The full cycle Fourier filter, however, is subject to the effect of an exponentially decaying DC offset, which may exist in the current waveform. This disadvantage of the full cycle Fourier is overcome by using a variation of the Fourier full cycle filter consisting of the cosine part of the exponential value shown in the above equation and then processing the waveform through a ½ cycle delay filter. This is typically known as a cosine filter.

A significant shortcoming of these conventional digital filters used to determine current magnitude, however, is that they will not accurately measure the magnitude of the current waveform when the current obtained from the power line is sufficiently large to undergo saturation in the current transformer. Because of the saturation of the current transformer, samples of the current from the line will have a smaller magnitude value than they would have without saturation. The consequence is that an overcurrent relay using digital filters will have a tendency to underreach, i.e. determine a smaller current value than the true value, because of CT (current transformer) saturation. This can result in a significant delay in the tripping action. In cases of extreme saturation, the element could completely fail to operate during a fault, which of course is quite undesirable.

The present invention is designed to remedy this disadvantage of existing overcurrent elements, such that they will properly operate even when the line current heavily saturates the transformer.

SUMMARY OF THE INVENTION

Accordingly, the present invention comprises: an instantaneous overcurrent element for use in a microprocessor-based protective relay for a power system, comprising: a digital filter circuit, responsive to a secondary current waveform from a current transformer which is responsive to a current waveform from the power line, for determining the magnitude of the current waveform; a peak detector circuit responsive to the secondary current waveform from the current transformer for determining the peak magnitude of the current waveform; a circuit for determining the distortion of the secondary waveform from the current transformer; a comparison element for comparing the distortion against a predetermined standard; and a switch connecting the output of the filter circuit to a fault determination circuit when the distortion is less than the predetermined standard and connecting the output of the peak detector to the fault determination circuit when the distortion is above the predetermined standard.

BEST MODE FOR CARRYING OUT THE INVENTION

As indicated above, present digital instantaneous overcurrent elements in a microprocessor based protective relay are implemented using digital filters. The digital filters typically comprise an orthogonal pair of finite impulse response filters or other filter arrangement. Examples of such filters include Fourier filters, cosine filters, and least squares fitting filters. It should be understood that the present invention does not require a particular kind of digital filter but can be used with a wide variety of digital filters.

Digital filters, however, have the disadvantage of operating inaccurately when the current from the power line is large enough to saturate the current transformers, resulting in a distortion of the output signal from the transformer. In some cases, the saturation is sufficient to delay the recognition of a fault and hence delay a tripping of the current breaker. This is referred to as underreach. Further, however, when the saturation is extreme enough, the underreach is sufficient that the overcurrent element actually fails to operate in a fault condition.

In the present invention, conventional digital filters are used, as they are in typical digital overcurrent elements. However, the distortion of the current waveform is continuously monitored to determine whether or not a saturation condition exists. A threshold value of distortion is established and when the distortion rises above that threshold, a peak detector circuit is used to determine current magnitude as opposed to the digital filter circuit. The peak detector circuit, which will be discussed in more detail hereinafter, provides a more reliable determination of current magnitude when a saturation condition exists. As long as the distortion of the current waveform is determined to be below the threshold, a conventional digital filter circuit, e.g. most commonly a cosine filter, is used to obtain the required current magnitude information; a fault determination is thereafter made in conventional fashion.

The magnitude determination capability thus switches between the conventional digital filter circuit and the peak detector circuit, depending upon the amount of distortion present in the current waveform. This dual arrangement overcomes the disadvantage of using a digital filter circuit by itself, which is subject to erroneous operation during heavy current saturation conditions, as discussed above.

Figure 1:
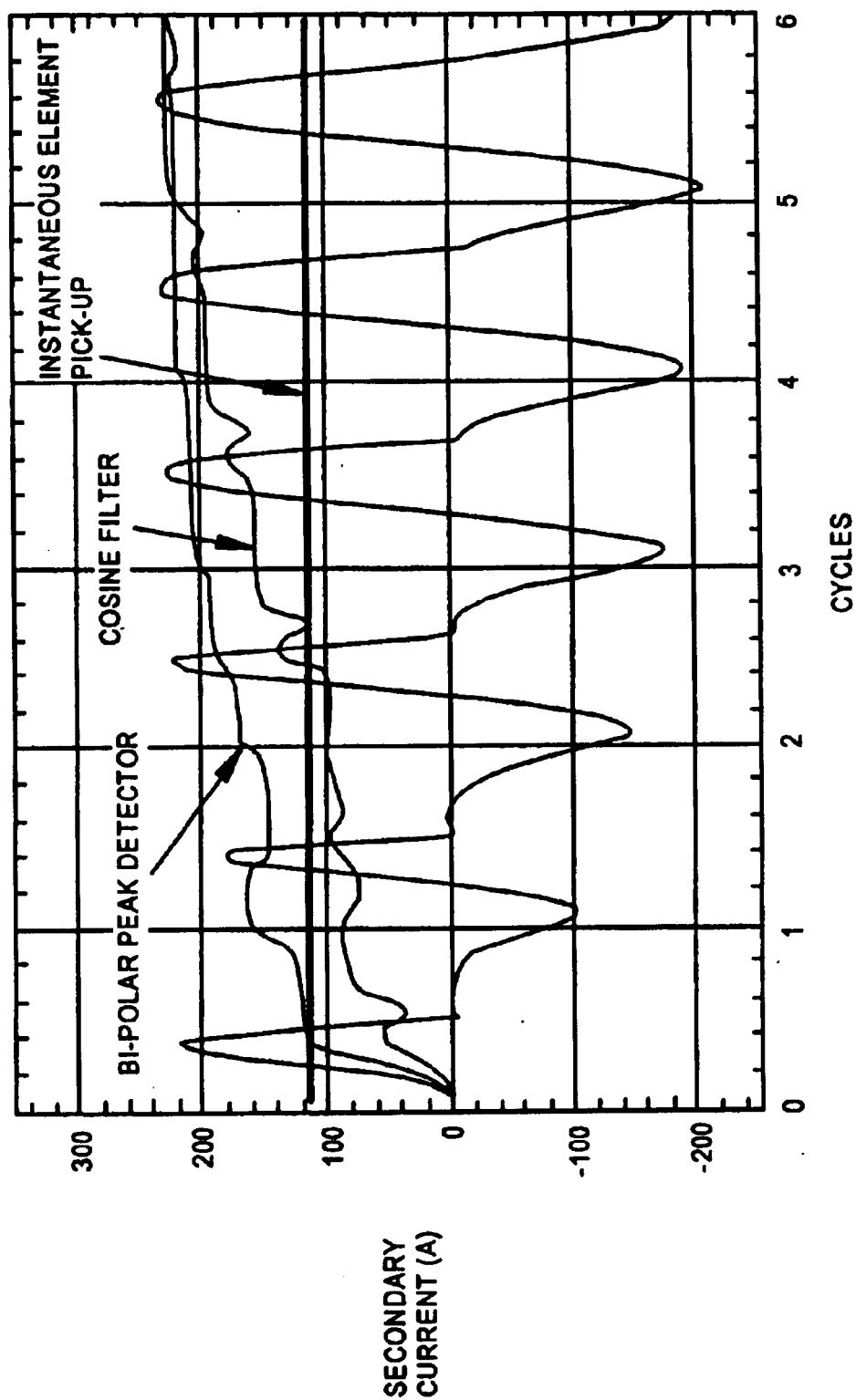
FIG. 1 is a diagram of the first several cycles of current for a fault producing significant current distortion, showing the operation of a peak detector and cosine filter relative to the fault.

FIG. 1 illustrates a current waveform with significant distortion produced by an asymmetrical fault, with an instantaneous current pickup value of approximately 100 amps. It shows that a bipolar peak detector will run through the pickup value line quite quickly, i.e. within half a cycle, while the filtered fundamental from the cosine filter takes approximately 2½ cycles to produce a pickup of the element, which is generally regarded as being too long. Thus, the peak detector can provide proper operation for the overcurrent element in situations of significant current distortion where the cosine filter requires a long time to operate or fails in operation altogether.

Figure 2:
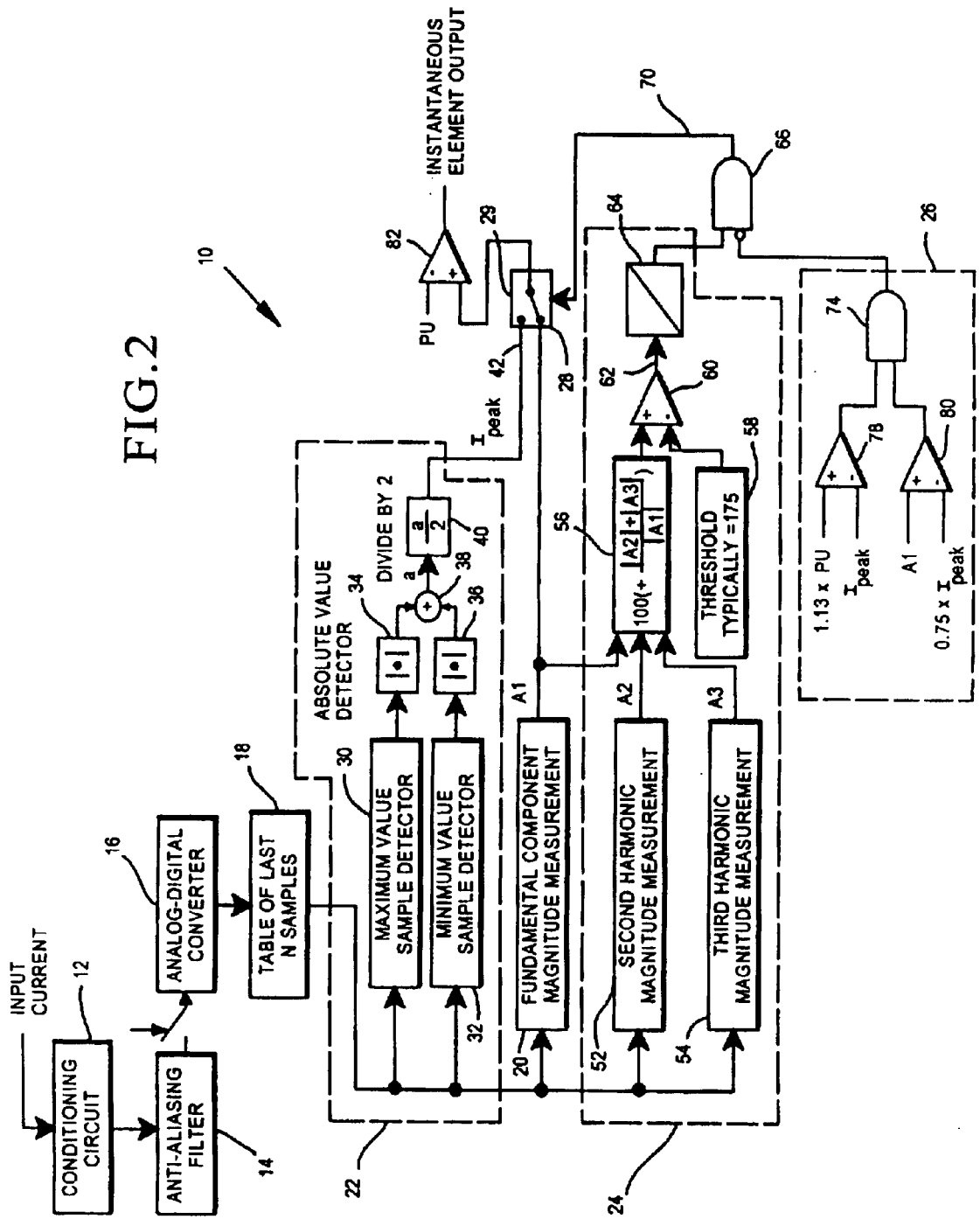
FIG. 2 is a block diagram of the instantaneous overcurrent element of the present invention implemented in digital logic.

FIG. 2 is a logic diagram of the digital instantaneous overcurrent element of the present invention, shown generally at 10. The current values from the system current transformer CT for one phase of current are applied to a conventional conditioning circuit 12 which produces a low voltage image of the primary line current and then an anti-aliasing filter 14 which removes frequency components from the signal that are higher than half the sampling frequency. The output of the anti-aliasing filter 14 is then sampled at a selected sampling frequency and the results applied to an analog-to-digital (A/D) converter 16. The output of the A/D converter is a series of digital signals, which are provided in a table of samples of the last previous power signal cycle at 18.

The samples are applied to three separate circuits. First, a pair of orthogonal finite impulse response filters represented generally As circuit 20 and used to determine current magnitude, a peak detector circuit shown generally at 22 and a distortion recognition circuit shown at 24. Two qualifying circuits relative to the operation of the peak detector are shown generally at 26. The digital filter circuit 20 is represented broadly. As pointed out above, the digital filter can be implemented with various digital filter embodiments. The digital filter circuit 20 in the embodiment shown is cosine a filter. The cosine filter will determine the magnitude of the current waveform. This value is applied to input 28 of switch 29.

The embodiment of FIG. 2 includes a bipolar peak detector. With a bipolar embodiment, the N samples cover one full power signal cycle. The maximum sample value is determined at block 30 and the minimum sample value is determined at block 32. The absolute values of these maximum/minimum values are obtained, respectively, at 34 and 36 with the two absolute values being added together by summing circuit 38 and then divided by 2 at divider 40. The output of divider 40 is the peak value of the current, which is applied to input 42 of switch 29.

The distortion circuit shown at 26 in FIG. 2 uses the magnitude of the fundamental component of the current waveform (from the filter circuit 20), the magnitude of the second harmonic of the current waveform at block 52 and the magnitude of the third harmonic at block 54. A distortion index value is calculated at block 56, using the formula set out therein. This is a common form for determining distortion, i.e. the ratio of the sum of the magnitudes of a selected number of harmonics, over the fundamental magnitude. In FIG. 2, the fundamental, first and second harmonics are used.

The formula is:

$$DI = 100\left(1 + \frac{|A2| + |A3|}{|A1|}\right)$$

where $A_1$ is the fundamental magnitude and $A_2$ and $A_3$ are the magnitudes of the second and third harmonics. For waveforms without any distortion or no harmonics, the distortion index will be equal to 100. For highly saturated waveforms, the distortion index will reach levels greater than 200.

In the present invention, the input current magnitude measurement for fault determination will switch from the digital filter circuit 20 to the peak detector circuit 22 when the distortion index is greater than a fixed threshold value. In the embodiment shown, the threshold value is set at 175 (block 58). This value is somewhat arbitrary, however, and could be changed.

A comparator 60 compares the output of calculation block 56 with the threshold value from block 58 and produces an output at 62, which is applied to a timer 64. The timer 64 provides a safety factor which overrides any temporary high value of the distortion index due to transients. The pickup time for timer 64 in the embodiment shown is ½ to 1 cycle while the dropout time typically is two sample periods. Thus, the output of timer 64 will be high following the pickup time from when the distortion goes above the selected threshold and remains high for two sample periods following the distortion decreasing below the threshold.

The output from timer 64 is applied to one input of AND gate 66. The output of AND gate 66 on control line 70 controls the operating position of switch 29. In one position, which is the default position in the embodiment shown, switch 29 will be connected to digital filter 20 as shown, while in the other position, the switch will be connected to the peak detector circuit 22.

The other input to AND gate 66 is a "not" input from AND gate 74. The qualifying circuit shown at 26 basically negates a high output of AND gate 66 (when the distortion has been identified as above the threshold) resulting in a return of switch 29 to the digital filter position. The qualifying circuit implements the following two conditions. For one condition, the preselected pickup value (PU) for the current element is multiplied by a factor of 1.13 and the result is compared against the peak value of the current, by comparator 78. The output of comparator 78 is high when the multiplied value is greater than Ipeak. For the other condition, the magnitude of the fundamental harmonic of the current is compared against the peak value of the current multiplied by 0.75, by comparator 80. If the fundamental ($A_1$) is greater than 0.75×Ipeak, the output of comparator 80 goes high.

The first condition as determined by comparator 78 indicates an overshoot condition while the second condition determined by comparator 80 indicates that there is little or no saturation in the current waveform. When both of these conditions are true, the output of AND gate of 74 is high, which results in a low input to AND gate 66, bringing the output of AND gate 66 low. When the output of AND gate 66 is low, switch 29 is connected to the digital filter magnitude circuit 20.

The output of switch 29 (the current magnitude from the filter circuit or the peak detector, depending on the distortion) is applied to output comparator 82 which compares the magnitude of the current against a predetermined pick-up value (PU) which could range from 5–100 amps, with 80 amps being a realistic value. If the current on the line exceeds this value, indicating a fault condition, then the output of comparator 82, which is the output of the instantaneous overcurrent element, will be high, which in turn will be applied as a trip signal to the circuit breaker.

Figure 3:
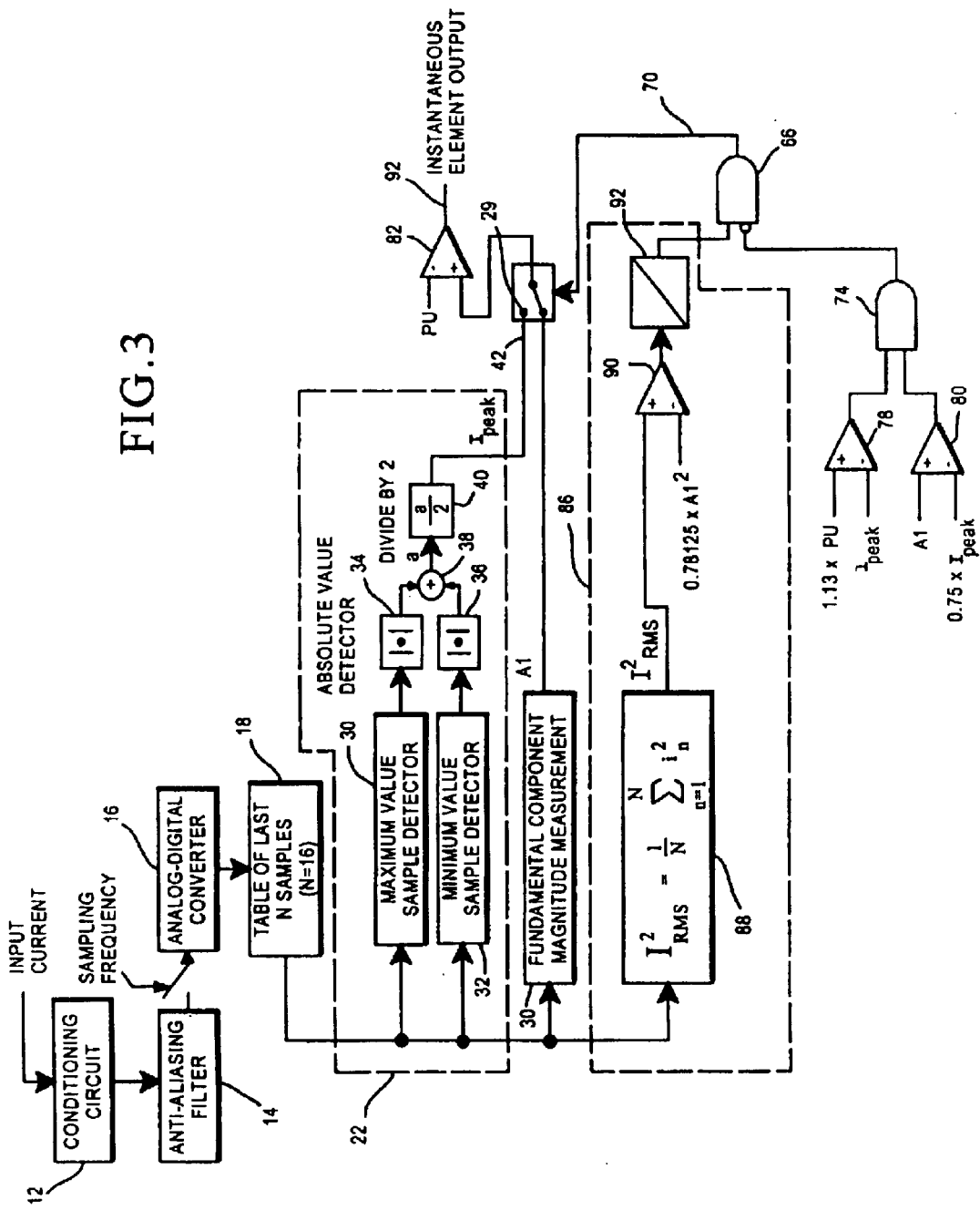
FIG. 3 is a block diagram of alternative embodiment to FIG. 1.

FIG. 3 is substantially identical to FIG. 2 except that the threshold determining circuit 86 uses RMS (root-means-square) values of line current for its distortion index determination, as opposed to the use of a fundamental magnitude value and second and third harmonic magnitude values in FIG. 2. As shown in FIG. 3, a root-means-square (RMS) determination is made at block 88. In this block, the RMS value of the waveform is determined by first squaring and then summing the samples within a data window of N samples:

$$I_{RMS}^2 = \frac{1}{N}\sum_{n=1}^{N} i_n^2$$

The distortion index can be defined as the ratio of the waveform RMS value squared over the fundamental value ($A_1$) squared as follows:

$$DI_{RMS} = 100\left(1 + \sqrt{\frac{2I_{RMS}^2 - A_1^2}{A_1^2}}\right)$$

If the distortion index is set at 175, the condition at which a switch to the peak detector becomes:

$$100\left(1 + \sqrt{\frac{2I_{RMS}^2 - A_1^2}{A_1^2}}\right) > 175$$

which is equivalent to:

$$I_{RMS}^2 > 0.78125 A_1^2$$

Referring to FIG. 3, the RMS value from circuit 88 is compared against the threshold value in comparator 90. The output of comparator 90 is applied to a timer 92, which operates similarly to the timer 64 of the embodiment of FIG. 2. The remainder of the circuit of FIG. 3 operates the same as FIG. 2 to produce an overcurrent element output signal on output line 92.

Hence, an instantaneous overcurrent element for use in a protective relay the power system has been disclosed which generally uses a cosine filter arrangement to obtain the current magnitude values for the fault determination unless the distortion of the waveform due to saturation of the current transformer reaches a preselected threshold, at which point the magnitude values are provided by a peak detector circuit. The magnitude values are compared against a threshold value in conventional fashion to provide output signals for the overcurrent element, which are directed to a circuit breaker in the event of a fault determination.

Although a preferred embodiment of the invention has been disclosed here for purposes of illustration, it should be understood that various changes, modifications and substitutions might be incorporated without departing from the spirit of the invention, which is defined by the claims, which follow.

What is claimed is:

1. An instantaneous overcurrent element for use in a microprocessor-based protective relay for a power system, comprising:

a digital filter circuit, responsive to a secondary current waveform from a current transformer which is responsive to a current waveform from the power line, for determining the magnitude of the current waveform;

a peak detector circuit responsive to the secondary current waveform for determining the peak magnitude of the current waveform;

a circuit for determining the distortion of the output from the current transformer;

a comparison element for comparing the distortion against a predetermined standard; and a switch connecting the output of the filter circuit to a fault determination circuit when the distortion is less than the predetermined standard and connecting the output of the peak detector to the fault determination circuit when the distortion is above the predetermined standard.

2. An overcurrent element of claim 1, wherein the distortion circuit uses the values of the fundamental and the second and third harmonics to determine the distortion.

3. An overcurrent element of claim 1, wherein the distortion circuit calculates the RMS value of the secondary current waveform and uses said RMS value to determine the distortion.

4. An overcurrent element of claim 1, wherein the digital filter circuit includes a pair of orthogonal full cycle Fourier digital filters.

5. An overcurrent element of claim 1, wherein the digital filter circuit includes a cosine filter.

6. An overcurrent element of claim 1, including a timer for preventing the peak detector from being used for a fault determination for a selected period of time following the distortion exceeding the predetermined standard so as to accommodate a transient current increase.

7. An overcurrent element of claim 1, wherein the peak detector circuit is not connected when the peak current is less than a selected pickup current value of the overcurrent multiplied by 1.13 and the fundamental harmonic value is greater than ¾ of the peak current value.

* * * * *